United States Patent [19]
Kohl et al.

[11] Patent Number: 5,763,074
[45] Date of Patent: Jun. 9, 1998

[54] HEAT SEALING FILM

[75] Inventors: Albert Kohl, Laumersheim; Karl Heinz Römer, Frankenthal; Werner Latzel, Oberkirch; Peter Heilmann, Bad Dürkheim; Michael Hitzfeld, Karlsruhe, all of Germany

[73] Assignee: BASF Magnetics GmbH, Ludwigshafen, Germany

[21] Appl. No.: 696,183

[22] Filed: Aug. 13, 1996

[30] Foreign Application Priority Data

Aug. 25, 1995 [DE] Germany .............. 195 31 313.5

[51] Int. Cl.$^6$ ........................................ C09J 7/02
[52] U.S. Cl. ............... 428/349; 428/354; 428/694 ST
[58] Field of Search ................... 428/349, 354, 428/694 ST

[56] References Cited

U.S. PATENT DOCUMENTS

| | | | |
|---|---|---|---|
| 4,107,380 | 8/1978 | Wiesman | 428/349 |
| 4,704,325 | 11/1987 | Crocker | 428/349 |
| 4,880,683 | 11/1989 | Stow | 428/349 |
| 5,185,203 | 2/1993 | Itaba | 428/349 |
| 5,599,621 | 2/1997 | Akhter | 428/349 |

FOREIGN PATENT DOCUMENTS 9314818.6 9/1993 Germany .
9414596.2 9/1994 Germany .

OTHER PUBLICATIONS

Jan M.G. Cowie, *Chemie und Physik der Polymeren*, New York, 1976, p. 297.

*Primary Examiner*—Jenna Davis
*Attorney, Agent, or Firm*—Keil & Weinkauf

[57] ABSTRACT

The heat sealing film and a magnetic transfer strip contain an adhesive layer comprising thermoplastic, immiscible binder components. One component is spherical, amorphous and embedded in finely distributed form in a homogeneous layer of the other, highly crystalline components in such a way that the spherical component protrudes hemispherically from the layer. The spherical binder is a glassy solid up to at least 60° C. and above 80° C. is plastically deformable. The hemispheres protruding from the adhesive layer produce a uniform, fine roughness of the surface. Both heat sealing film and magnetic transfer strip are nonblocking up to at least 60° C. and heat-sealable at temperatures greater than 80° C. The adhesive layer imparts to a magnetic recording medium a uniform thickness of the adhesive joint and a permanent, temperature-resistant adhesive force.

17 Claims, 1 Drawing Sheet

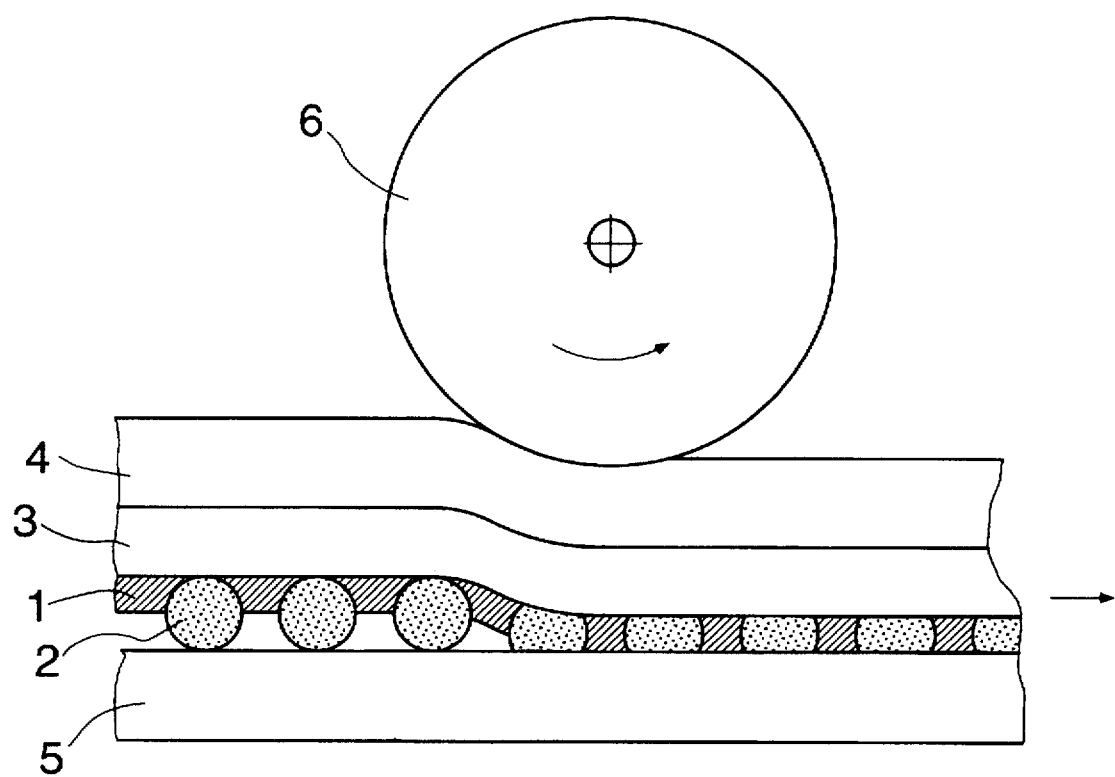

HEAT SEALING FILM

FIELD OF THE INVENTION

The invention relates to a heat sealing film comprising a flexible layer support and a heat-sealable coating layer comprising organic polymers, and also to a heat-sealable magnetic transfer strip and a magnetic recording medium produced therefrom.

BACKGROUND OF THE INVENTION

Heat sealing films of this generic type are already known for a wide variety of applications.

One embodiment comprises thermal transfer films which contain, between the flexible layer support and the heat-sealable coating layer, one or more transfer layers. For the purpose of inscribing or esthetically upgrading the surfaces of solids, this layer or these layers may, for example, contain colored pigments, finely distributed in an organic binder matrix. The finely distributed pigment particles may also be magnetizable, as for example in the case of magnetic transfer strips which are used to produce magnetic cards. In this context, the films of this generic type are pressed by the known heat-sealing process at elevated temperatures and under superatmospheric pressure onto an appropriate substrate, which may be either rigid or flexible.

In heat sealing, as is known, the heat-sealable thermoplastic coating layer melts to form an adhesive joint between the substrate and the support film. In the case of the thermal transfer films, the adhesive strength of the adhesive joint between the substrate and the transfer layer after heat sealing is greater than the adhesive force between transfer layer and carrier film. Accordingly, the carrier film can be detached mechanically from the transfer layer immediately after bonding.

Modern heat sealing installations use heat sealing films wound up into the form of rolls. The rolls must be unrolled without creases and transported uniformly into the heat sealing area, where transfer should be as rapid as possible. Consequently, the heat-sealable coating layer must be such that on the one hand it is not capable of adhesion at the unwinding and transport temperature, and in particular does not block, ie. does not stick to the back of the heat sealing film or to the surface of the transport device used. On the other hand, the heat-sealable layer should plastify rapidly during its short residence period in the transfer area and should bond with the substrate.

A known and simple way of achieving this object consists in laminating the surface of the heat-sealable layer with a release layer of nonadhering film or paper which is not removed from the coating layer until directly before heat sealing. Examples of suitable release layers for this application are paper films which are impregnated with an antiadhesive, for example silicone oil. A disadvantage is that the release layer must be disposed of, entailing additional costs for winding and disposal. Furthermore, mechanical detachment of the release layer is always accompanied by the removal of part of the heat-sealable coating layer, producing an adhesive joint whose thickness is subject to local variations, with the adhesive force after the heat sealing operation varying in dependence on the thickness of the adhesive joint.

An alternative attempt at a solution is constituted by German Utility Model G 93 14 818. This describes a heat sealing film having a heat-sealable coating layer which is formed from a two-component layer comprising organic polymers, the first component consisting of a polyacrylate adhesive and the second component of nonadhesive polystyrene which softens only at above 100° C. As described in this disclosure, the resulting heat sealing film is nonblocking at temperatures below 80° C. and becomes capable of adhesion only above 100° C.

This technical disclosure also has the disadvantage that the thickness of the adhesive joint cannot be controlled during the heat sealing process. One of the reasons for this is that part of the adhesive layer is pressed out at the edge of the heat sealing film because of temperature and pressure. Secondly, especially in the case of absorbent substrates, the liquid adhesive component partially penetrates these substrates, so that the use of fibrous or porous substrates results in a locally variable adhesive force which is much too low.

In a further German Utility Model, G 94 14 596, a description is given of heat sealing films having a carrier film and a heat-sealable coating layer, which layer consists of at least one thermoplastic adhesive layer having a softening temperature of from 40° to 150° C. and can also, advantageously, comprise inert fillers. In a further advantageous embodiment, the coating layer can also consist of two adhesive layers lying one above the other, the adhesive layer adjacent to the carrier film having a higher glass transition temperature $T_g$ than the second layer which lies above it.

This disclosure is also hampered by the disadvantages already set out. Unless they protrude from the heat-sealable layer, the inert fillers are unable to prevent the tendency to stick, ie. the blocking of the film during unrolling or transportation. It is similarly impossible to control the thickness of the adhesive joint during the heat sealing operation, especially not when the fillers are hard, incompressible and of nonuniform size. In the case of the two layers lying one above the other, there is the additional risk of the sticking tendency of the above soft, thermoplastic layer leading to the blocking of the film prior to the heat sealing operation.

SUMMARY OF THE INVENTION

It is therefore the object of the present invention to provide a heat sealing film which, on the one hand, is nonblocking within a wide temperature range, can be unwound without problems at any time from a wound roll, and can be transported in high-speed heat sealing installations, and which, on the other hand, ensures a uniform adhesive joint during the heat sealing operation. In this context, the heat-sealable coating layer should be quick-melting and yet should not be soaked up by absorbent substrate materials such as paper, nonwovens or the like. Furthermore, when nonabsorbent substrates are used, the heat-sealable, liquid adhesive layer should not be pressed out from the sides of the web of heat sealing film.

We have found that this object is achieved in accordance with the invention by a heat sealing film comprising a flexible layer support and a heat-sealable coating layer comprising organic polymers, wherein the coating layer comprises at least two incompatible thermoplastic binder components consisting of an amorphous binder component which is spherical and is finely distributed in a layer, which surrounds it, comprising thermoplastic binder components of high crystallinity and a narrow softening temperature range, where the glass transition temperature $T_g$ of the spherical component is less than the melting point $T_m$ of the binder components of high crystallinity but greater than the $T_g$ of the binder components of high crystallinity, and the spherical component protrudes hemispherically from the free surface of the coating layer and by a magnetic transfer strip consisting of a flexible layer support with at least one detachable magnetizable recording layer and a cover layer, wherein the cover layer is formed by a heat-sealable coating layer. Further details can be found in the abstract, the description and the figure.

DETAIL DESCRIPTION OF THE INVENTION

The subject of the invention will first be illustrated in more detail with reference to the figure. This figure shows a heat sealing film (1, 2, 3, 4) in the course of heat sealing to a suitable substrate (5) which may consist in principle of rigid or flexible plastic, paper, nonwoven or the like. An essential feature of the invention is that the polymer spheres (2) of the amorphous layer component having the lowest softening temperature, which protrude hemispherically from the coating layer (1), cause the coating layer (1, 2) to be of low roughness at low temperatures, with the consequence that the heat sealing film (1, 2, 3, 4) becomes able to glide and can be unwound without creasing from a wound roll. Only on exceeding their softening temperature and under the action of the pressure of a heated press roll (6) or a die, in the heat sealing zone, are the polymer spheres (2) plasticized. In this plasticized form they are pressed onto the substrate (5) and compressed to the thickness of the other, already liquid binder components (1).

The invention provides a heat sealing film (1, 2, 3, 4) which is heat-sealable at a film temperature which is higher than the softening temperature of the spherical binder component (2). At film temperatures lower than this softening temperature, the heat sealing films (1, 2, 3, 4) can be wound without problems and are nonblocking.

The precise chemical composition of the components (1, 2) in the heat-sealable layer is not essential to the invention. Critical factors are, rather, the temperature variation of the elastic properties of the spherical component (2) and the relative position of the melting temperatures of the binder components (1, 2).

Typical characteristic temperature curves for the modulus of elasticity of amorphous and partially crystalline polymers are shown, for example , in "Chemie und Physik der Polymeren" (Jan M. G. Cowie, Verlag Chemie, 1976, page 297). At low temperatures, below the $T_g$, thermoplastic polymers have a glassy rigidity, with a modulus of elasticity of approximately $10^9$—$10^{10}$ Pa. On reaching the glass transition temperature, the modulus of elasticity decreases significantly within a range of approximately 20° C. to not more than 40° C.

In the case of amorphous polymers, the ratio of the moduli of elasticity below and above, $T_g$ is particularly great: for amorphous standard polystyrene, for example, it is approximately $10^4$ Pa. This is followed, at higher temperatures, by a rubber-elastic plateau, in which the material is plastically deformable. Finally, there is a gradual transition to the liquid melt state, which in the case of amorphous polystyrene takes place only above about 180° C. Amorphous polymers therefore soften principally in the glass transition range from approximately $T_g-20°$ C. to $T_g+20°$ ) C. Above $T_g +20°$ C. they are plastically deformable within a wide, rubber-elastic region.

In the case of the thermoplastic polymers of high crystallinity, on the other hand, the modulus of elasticity stage is much less pronounced, with the size of this modulus below and above $T_g$ being approximately proportional to the degree of crystallinity. Above $T_g$ a precisely defined melting point $T_m$ is observed, at which the crystallites melt and the modulus of elasticity falls to zero. For polymers of high crystallinity the size of the corresponding melting and softening range is particularly small: in the case of crystalline polystyrene, for example, it is approximately 20° C.

In accordance with the invention the binder components (1, 2) are chosen such that the spherical component (2) is amorphous and has a $T_g$ which is at least 5° C. to not more than 100° C., preferably by 10° to 30° C., lower than the melting point $T_m$ of the other binder components (1) of high crystallinity, with $T_m$ lying within the rubber-elastic plateau of the amorphous component (2).

It is advantageous for all of the binder components to possess a softening range which is as narrow as possible. This is the case with the thermoplastic binder components according to the invention. In the concrete embodiment of the example according to the invention, the respective softening range of the binder components in the heat-sealable coating layer (1, 2) is from 20° to not more than 40° C.

The invention also embraces a magnetic transfer strip consisting of a flexible layer support (4) which is known per se and consists, for example, of polyethylene terephthalate, having at least one magnetizable recording layer (3) which is detachable from said support and whose composition is known, and having a heat—sealable coating layer (1, 2) according to the invention. A release layer (not shown) which is known per se may or may not be arranged between the flexible layer support (4) and the magnetizable recording layer (3), this release layer being for example a polymeric adhesion layer with a softening temperature which is lower than the softening temperature of all of the binder components in the heat-sealable coating layer according to the invention. Instead of an adhesion layer, an antiwear layer comprising hard, inorganic particles may also be applied, which, in the case of the subsequent preferred use of the heat-sealed magnetic transfer strip gives the end product, a magnetic card or the like, a greater resistance to wear.

Also part of the invention is a magnetic recording medium, for example a magnetic card or magnetic film, having a nonmagnetizable substrate (5) consisting preferably of paper or plastics, for example polyvinyl chloride or polypropylene. This is produced in a known manner from the magnetic transfer strip according to the invention by heat sealing and transferring the magnetizable transfer layer (3) to the substrate (5) see figure. After finishing, the heat-sealable coating layer (1, 2) according to the invention is located between the substrate (5) and the transfer layer (3) in such a way as to give a low temperature-resistant adhesive joint at high adhesive strength and uniform thickness. In this arrangement, the originally spherical binder component (2) is in the compressed state in the form of columns between substrate and transfer layer, with the interstices being filled by the other binder components (1).

In further advantageous embodiments of the invention it is possible, for example, to add conductive pigment particles or color pigments to the heat-sealable coating layer in order to produce optical color effects or to establish a defined electrical conductivity in the transfer layers. Particles of carbon black or metal which absorb in the entire visible wavelength range can also be mixed in, in order to obtain a high level of light absorption. However, with all of these pigments it should be ensured within the context of the invention that the mean particle diameter of the pigments in the coating layer is less than the mean thickness of the coating layer itself and thus less than the mean diameter of the spherical binder component.

In addition, the invention has the further advantageous effect that the heat sealing film applied to the substrate, or the transfer layer, has a flat, shiny and visually appealing surface because the thickness of the underlying heat sealing layer is constant. A further advantage is that the thickness of the adhesive joint, even after repeated increases in temperature to not more than the $T_g$ of the spherical binder component (2) and even on absorbent substrates, is of an unerring constancy. Consequently, the adhesive force is retained permanently.

The heat sealing film according to the invention with the heat-sealable coating layer is produced advantageously by coating the layer support (4) with a solution of the binder components (1, 2) in an organic solvent and then drying the coating layer (1,2). Coating can in principle be carried out using any of the methods which are known per se and are suitable for the application of liquids, for example by means of extrusion coaters, application by smooth or patterned rolls, or combinations of these techniques. Continuous methods, such as those given by way of example, are particularly suitable for a high coating performance.

The comments made above regarding the preparation techniques also apply to thermal transfer films, for example magnetic transfer strip, which are composed essentially of a flexible layer support with one or more transfer layers and with the heat sealing layer, arranged thereon. It is necessary merely to provide one or more coating operations for the transfer layers prior to the coating of the heat sealing layer.

Layer supports suitable for producing the heat sealing films according to the invention may in principle consist of any flexible material in sheet form. Particularly suitable materials are plastic films, made for example of polyethylene terephthalate, polyethylene naphthalate or polypropylene sulfide, polyimide films and other films which likewise possess a high thermal stability and mechanical tensile strength.

The heat-sealable coating layer composition (1, 2) including a spherical binder component (2), according to the invention, is produced with particular advantage during the preparation of the coating solution. For this purpose, in accordance with the present invention, use is made of the effect of the immiscibility of polymers in appropriate solvents, with an immiscible component being precipitated in droplet form after the individual solutions have been combined. So that the resulting emulsion remains stable, it is subjected to constant stirring and mixing, right up until the coating operation. It is also helpful to use an appropriate emulsifier as well.

It has been found in extensive tests that the size of the immiscible, spherical droplets is determined substantially by the concentrations of the individual dissolved quantities and their proportions. Even after the application and drying of the binder emulsion, the droplets within the coating layer were still spherical and of unaltered size. Depending on the binder system, solvent and individual concentrations, and also proportions, it was possible to obtain a spherical, immiscible binder component within the coating layer which had a mean diameter of from about 1 μ m to about 10 μ m.

The described immiscibility of binder solutions has been found to apply to the amorphous and partially crystalline binders which are relevant to the invention, as well, and the technique was developed to the stage where the amorphous binder component was precipitated in droplet form in a controlled manner. This corresponding emulsion was used to prepare heat sealing films and magnetic transfer strips.

In principle, however, other possible methods of providing a heat-sealable binder layer with spherical thermoplastic polymers are conceivable, and should not be ruled out by the preferred option described.

In accordance with the invention, the size of the spherical binder component (2) in the binder solution was adjusted in the manner described such that the mean diameter was in each case greater than the mean thickness of the finished, heat-sealable coating layer (1).

EXAMPLE 1

A) Preparation of the emulsion

Solution 1:

9.60 kg of solid epoxy resin Epikote 1007$^{a)}$ of $T_g = 70°$ C. and melting point $T_m = 117°$ C. were dissolved completely in a solvent mixture comprising 11.20 kg of acetone and 11.20 kg of methyl ethyl ketone (MEK). a): Epikote 1007 is a trademark of Shell.

Solution 2:

2.55 kg of a hydroxyl—containing, highly crystalline polyester polyurethane of $T_g = 35°$ C. and $T_m = 110$ C. were dissolved completely in a solvent mixture comprising 7.22 kg of acetone and 7.22 kg of MEK.

Solution 3:

2.85 kg of granules of amorphous standard polystyrene with a $T_g = 95°$ C. and a broad rubber-elastic range from 105° C. to at leat 180° C. were dissolved completely in a solvent mixture comprising 3.32 kg of acetone and 3.32 kg of MEK.

Emulsion:

A mixture of 20.75 kg of acetone and 20.75 kg of MEK was introduced into a stirred vessel with a capacity of about 150 l which was fitted with a high-speed stirrer. Subsequently, with the stirrer disk running at a speed of from 1300 to 1350 per minute, solutions 1, 2 and 3 were added in succession. After adding solution 3, an emulsion was formed which contained the polystyrene in the form of spherical particles with a diameter of from approximately 4 μm to 6 μm.

The size of the polystyrene spheres was measured by means of drawn-out samples prepared using a conventional doctor blade on polyethylene terephthalate (PET) film, with a wet layer thickness of 33 μm. The coating emulsion was stirred continuously in the coating machine up to the point where the emulsion was applied.

B) Production of the magnetic transfer strip and the magnetic recording medium

In a customary sheet coating machine for the continuous coating of rolls of film by the extrusion technique, the magnetic transfer strip was produced in two passes. on the first pass, a magnetic layer was applied by means of a coater lip with a liquid magnetic dispersion to a PET film which was 24 μm thick and 600 mm wide, and the coated film was then dried in a sheet dryer at approximately 80° C. and consolidated in a calender. During the coating operation the coater lip was set such that the thickness of the finished magnetic layer was approximately 8–10 μm. The magnetic dispersion contained a customary mixture of organic solvent THF, a binder mixture dissolved therein and comprising a hydroxyl—containing polyurethane, a phenoxy resin and a polyfunctional isocyanate as crosslinking agent, and finally acicular $CrO_2$ with a small proportion of $Al_2O_3$ mixed in as a nonmagnetic additive.

In the second pass, the heat-sealable coating layer (1, 2) was applied to the dry and crosslinked magnetic layer (3). To this end, the emulsion already described, containing the finely distributed polystyrene spheres, was coated continuously using the coating bar, and the coating film was then dried at approximately 70° C. and wound up in roll form. The thickness of the heat sealing layer was 3.5 µm. Finally the roll, depending on requirements, was cut up into strips with a width of from 8 to 16 mm.

In order to produce the magnetic recording medium, the magnetic transfer strip (1, 2, 3, 4) and a flexible nonmagnetic plastics film (5) of temperature—resistant polyvinyl chloride (PVC) were unwound simultaneously from their separate rolls and brought into contact such that the heat sealing layer contacted the PVC film (5). By means of a rotating steel roll (6) which was heated to 170° C. and pressed against the uncoated reverse (4) of the magnetic transfer strip, the magnetic layer was transferred to the film. Then, in the same operation, the layer support (4) of the transfer strip was removed and the finished magnetic recording medium (3, 1, 2, 5) was wound up in the form of rolls.

We claim:

1. A heat sealing film comprising a flexible layer support and a heat-sealable coating layer comprising organic polymers, wherein the coating layer comprises at least two incompatible thermoplastic binder components comprising an amorphous binder component which is spherical and is finely distributed in a layer, which surrounds it and comprises thermoplastic binder components of high WATZENBERGER et al., Ser. No. 08/711,907 crystallinity and a narrow softening temperature range, where the glass transition temperature $T_g$ of the spherical component is less than the melting point $T_m$ of the binder components of high crystallinity but greater than the $T_g$ of the binder components of high crystallinity, and the spherical component protudes hemispherically from the free surface of the coating layer, wherein the mean thickness of said coating layer is not greater than the mean diameter of the spherical binder component.

2. A heat sealing film as defined in claim 1, wherein the binder components of the coating layer are immiscible in organic solvents with an immiscible, spherical binder component.

3. A heat sealing film as defined in claim 1, where the $T_g$ of the spherical binder component is at least 60° C.

4. A heat sealing film as defined in claim 1, where the $T_g$ of the spherical binder component is from at least 5° to not more than 100° C. less than the $T_m$ of the thermoplastic binder components of relatively high crystallinity.

5. A heat sealing film as defined in claim 1 where the coating layer additionally comprises finely distributed inorganic or organic pigment particles.

6. A heat sealing film as defined in claim 5, where the mean diameter of the pigment particles in the coating layer is less than the mean thickness of the coating layer.

7. A heat sealing film as defined in claim 5, where the pigments of the coating layer comprise conductive particles.

8. A heat sealing film as defined in claim 5, where the pigments of the coating layer comprise dye particles.

9. A heat sealing film as defined in claimed 8, where the dye particles absorb strongly in the wavelength region between 350 and 700 nm.

10. A magnetic transfer strip consisting of a flexible layer support with at least one detachable magnetizable recording layer and a cover layer, wherein the cover layer is formed by a heat-sealable coating layer as set forth in claim 1.

11. A magnetic transfer strip as claimed in claim 10, where a release layer comprising polymers is applied between the flexible layer support and the magnetizable recording layer.

12. A magnetic transfer strip as defined in claim 10, where an antiwear layer comprising hard, inorganic pigment particles is applied between the flexible layer support and the magnetizable recording layer.

13. A magnetic recording medium comprising a nonmagnetizable substrate with an adhesion layer and at least one magnetizable layer lying above it, wherein the adhesion layer is formed by a heat-sealable coating layer as set forth in claim 1.

14. A magnetic recording medium as defined in claim 13, where the nonmagnetizable substrate has an absorbent surface.

15. A magnetic recording medium as defined in claim 13, where the adhesion layer comprises conductive pigment particles.

16. A magnetic recording medium as defined in claim 13 where the adhesion layer comprises color pigments.

17. A heat sealing film as defined in claim 1, wherein the $T_g$ of the spherical binder is from at least 10° to not more than 30° C.

* * * * *

UNITED STATES PATENT AND TRADEMARK OFFICE
CERTIFICATE OF CORRECTION

PATENT NO.: 5,763,074

DATED: June 9, 1998

INVENTOR(S): KOHL et al.

It is certified that error appears in the above-identified patent and that said Letters Patent is hereby corrected as shown below:

Col. 7, claim 1, lines 24 and 25, delete "WATZENBERGER et al., Ser. No. 08/711,907".

Signed and Sealed this

Eleventh Day of August 1998

Attest:

BRUCE LEHMAN

Attesting Officer

Commissioner of Patents and Trademarks